(12) United States Patent
Konishiike et al.

(10) Patent No.: US 8,029,932 B2
(45) Date of Patent: *Oct. 4, 2011

(54) ANODE AND BATTERY

(75) Inventors: Isamu Konishiike, Fukushima (JP); Kenichi Kawase, Fukushima (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/280,703

(22) Filed: Nov. 16, 2005

(65) Prior Publication Data

US 2006/0110662 A1    May 25, 2006

(30) Foreign Application Priority Data

Nov. 25, 2004   (JP) ................ P2004-341183

(51) Int. Cl.
*H01M 4/64* (2006.01)
*H01M 4/80* (2006.01)
*H01M 4/58* (2010.01)

(52) U.S. Cl. .............. 429/233; 429/235; 429/218.1

(58) Field of Classification Search ........... 429/233, 429/235, 218.1
See application file for complete search history.

(56) References Cited

U.S. PATENT DOCUMENTS

| 5,162,178 | A * | 11/1992 | Ohsawa et al. | 429/213 |
| 5,817,222 | A * | 10/1998 | Kaneko | 204/293 |
| 6,667,000 | B1 * | 12/2003 | Nakazato et al. | 264/104 |
| 2003/0088971 | A1 * | 5/2003 | Visco et al. | 29/623.1 |
| 2004/0157124 | A1 * | 8/2004 | Goh et al. | 429/231.1 |
| 2004/0166409 | A1 * | 8/2004 | Takada et al. | 429/218.1 |

FOREIGN PATENT DOCUMENTS

| JP | 2002-313319 | 10/2000 |
| JP | 2002-313319 | 10/2002 |
| JP | 2002-373647 | 12/2002 |
| WO | WO 01/31723 | 5/2001 |

OTHER PUBLICATIONS

Sunnen, "Technical Data Surface Finish Information", Jun. 10, 2010, www.sunnen.com/graphics/assets/documents/d0235a2dedle.pdf.*

* cited by examiner

*Primary Examiner* — Gregg Cantelmo
*Assistant Examiner* — Eugenia Wang
(74) *Attorney, Agent, or Firm* — K&L Gates LLP (57) ABSTRACT

An anode capable of improving cycle characteristics and a battery using it are provided. An anode active material layer containing Si is provided on an anode current collector. The anode current collector is roughened by providing a projection on a base material with a ten point height of roughness profile Rz1 of 2.0 μm or less. A value of a difference, Rz2–Rz1 obtained by subtracting the ten point height of roughness profile Rz1 of the base material from a ten point height of roughness profile Rz2 of the anode current collector is from 0.2 μm to 5.1 μm. Thereby, even when the anode active material is expanded and shrunk due to charge and discharge, breakage of the anode current collector, fall off of the anode active material layer and the like can be prevented.

13 Claims, 6 Drawing Sheets

FIG. 10 — COMPARATIVE EXAMPLE 1-10 SEM SURFACE

FIG. 11 — COMPARATIVE EXAMPLE 1-10 SEM CROSS SECTION

FIG. 12 — COMPARATIVE EXAMPLE 1-10 SIM CROSS SECTION

ANODE AND BATTERY

CROSS REFERENCES TO RELATED APPLICATIONS

The present application claims priority related to Japanese Patent Application JP 2004-341183 filed in the Japanese Patent Office on Nov. 25, 2004, the entire contents of which being incorporated herein by reference.

BACKGROUND

The present invention relates to an anode in which an anode active material layer containing silicon (Si) as an element is provided on an anode current collector and a battery including it.

In recent years, as mobile devices have been highly advanced and multi-functionalized, high capacity of secondary batteries, the power source thereof has been demanded. As a secondary battery to meet such a demand, there is a lithium ion secondary battery. However, the lithium ion secondary battery currently in practical use uses graphite for the anode, and therefore the battery capacity is in a saturated state, and it is difficult to attain significant high capacity. Therefore, it has been considered to use silicon or the like for the anode, and it has been reported that an anode active material layer is formed on an anode current collector by vapor-phase deposition method or the like recently. Since expansion and shrinkage due to charge and discharge are large when silicon or the like is used, lowered cycle characteristics due to pulverization has been an issue. However, by using vapor-phase deposition method or the like, pulverization can be inhibited, and the anode current collector and the anode active material layer can be integrated. Therefore, electron conductivity in the anode becomes very favorable, and improvement in both the capacity and the cycle life is promising.

However, even in the anode in which the anode current collector and the anode active material layer are integrated, there has been a shortcoming that when charge and discharge are repeated, the anode active material layer is strongly expanded and shrunk, a stress is applied between the anode current collector and the anode active material layer, fall off or the like of the anode active material layer is caused, leading to lowered cycle characteristics. Therefore, it has been considered that by roughening the anode current collector, contact characteristics with the anode current collector are improved (for example, refer to International Publication No. WO01/031723 and Japanese Unexamined Patent Application Publication No. 2002-313319). In these publicly known examples, an anode current collector in which a projection is formed in an electrolytic copper foil having concavity and convexity by electrolytic plating is described.

However, there has been a shortcoming as follows. That is, the electrolytic copper foil having concavity and convexity as above has a structure in which columnar crystal is oriented in the thickness direction, and the grain boundary often exists in the concavity portion. Therefore, when the anode active material layer is expanded and shrunk due to charge and discharge, the anode is often broken along the grain boundary of the concavity portion. Further, there has been a shortcoming that since the surface roughness of the electrolytic copper foil corresponds to the grain diameter of columnar crystal, the thickness of the electrolytic copper foil largely affects the surface roughness, and it is difficult to change the surface roughness regardless of the thickness. Further, in such an electrolytic copper foil, the surface roughness often becomes larger than the targeted value, and further it is difficult to adjust the surface roughness of the both faces to the same degree.

SUMMARY

In view of the foregoing, in the present invention, it is desirable to provide a battery capable of inhibiting breakage of the anode current collector, fall off of the anode active material layer and the like and improving battery characteristics such as cycle characteristics.

According to an embodiment of the present invention, there is provided an anode in which an anode active material layer containing silicon as an element is provided on an anode current collector, wherein the anode current collector has a base material and a projection provided on the base material, a ten point height of roughness profile Rz1 of the base material on the face on which the anode active material layer is provided is 2.0 μm or less, a difference Rz2−Rz1 obtained by subtracting the ten point height of roughness profile Rz1 of the base material from a ten point height of roughness profile Rz2 of the anode current collector on the face on which the anode active material layer is provided is from 0.2 μm to 5.1 μm.

According to an embodiment of the present invention, there is provided a battery including a cathode, an anode, and an electrolyte, in which in the anode, an anode active material layer containing silicon as an element is provided on an anode current collector, the anode current collector has a base material and a projection provided on the base material, a ten point height of roughness profile Rz1 of the base material on the face on which the anode active material layer is provided is 2.0 μm or less, and a difference Rz2−Rz1 obtained by subtracting the ten point height of roughness profile Rz1 of the base material from a ten point height of roughness profile Rz2 of the anode current collector on the face on which the anode active material layer is provided is from 0.2 μm to 5.1 μm.

According to the anode of the embodiment of the present invention, the anode current collector is roughened by providing the projection on the relatively smooth base material with the ten point height of roughness profile Rz1 of 2.0 μm or less. Therefore, even if the anode active material layer is largely expanded and shrunk due to charge and discharge, breakage of the anode current collector can be inhibited. Further, the thickness and the surface roughness of the anode current collector can be freely decided, and contact characteristics of the anode active material layer can be easily improved. Further, the surface roughness of the both faces of the anode current collector can be easily controlled. Therefore, battery characteristics such as a capacity and cycle characteristics can be improved.

In particular, when the ten point height of roughness profile Rz2 of the anode current collector is from 1.3 μm to 3.5 μm, higher effects can be obtained.

Additional features and advantages are described herein, and will be apparent from, the following Detailed Description and the figures.

DETAILED DESCRIPTION

An embodiment of the present invention will be hereinafter described in detail with reference to the drawings.

Figure 1:
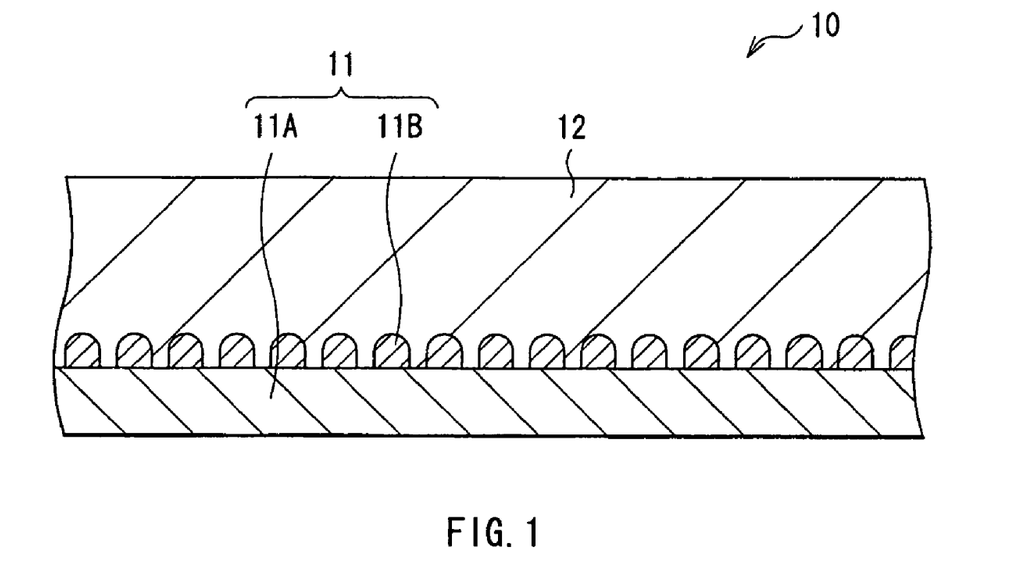
FIG. 1 is a cross section showing a structure of an anode according to an embodiment of the present invention.

FIG. 1 shows a structure of an anode 10 according to an embodiment of the present invention. The anode 10 has a structure in which, for example, an anode active material layer 12 containing silicon as an element is provided on an anode current collector 11. Silicon has a high ability to insert and extract lithium (Li), and provides a high energy density. Silicon may be contained as a simple substance, an alloy, or a compound. In FIG. 1, the case in which the anode active material layer 12 is provided on the single face of the anode current collector 11 is shown. However, the anode active material layer 12 may be provided on the both faces of the anode current collector 11.

The anode current collector 11 has a base material 11A and a particulate projection 11B provided on the base material 11A. By anchor effect by the projection 11B, contact characteristics between the anode current collector 11 and the anode active material layer 12 can be improved.

The base material 11A is preferably made of a metal material containing a metal element not forming an intermetallic compound with lithium. When an intermetallic compound is formed with lithium, expansion and shrinkage occur due to charge and discharge, structure is destructed, and current collection characteristics are lowered. In addition, ability to support the anode active material layer 12 is lowered. In this specification, the metal material includes not only a simple substance of a metal element, but also an alloy including two or more metal elements or an alloy including one or more metal elements and one or more metalloid elements. As a metal element not forming an intermetallic compound with lithium, for example, copper (Cu), nickel (Ni), titanium (Ti), iron (Fe), or chromium (Cr) can be cited.

Further, in some cases, the base material 11A more preferably contains a metal element capable of being alloyed with the anode active material layer 12. By such alloying, contact characteristics between the anode current collector 11 and the anode active material layer 12 can be more improved. As a metal element, which does not form an intermetallic compound with lithium and is alloyed with the anode active material layer 12, that is, as a metal element being alloyed with silicon, copper, nickel, or iron can be cited.

The base material 11A may be composed of a single layer, or may be composed of a plurality of layers. In the latter case, it is possible that the layer contacting the anode active material layer 12 is made of a metal material easily being alloyed with the anode active material layer 12, and other layers are made of other metal materials.

It is enough that the projection 11B is provided at least on the face of the base material 11A, on which the anode active material layer 12 is formed. The projection 11B preferably contains an element capable of being alloyed with the anode active material layer 12. Such alloying leads to improvement of contact characteristics with the anode active material layer 12. As an element easily being alloyed with silicon, for example, copper, nickel, iron, aluminum (Al), indium (In), cobalt (Co), manganese (Mn), zinc (Zn), silver (Ag), tin (Sn), germanium (Ge), or lead (Pb) can be cited. The element of the projection 11B may be identical to of the base material 11A or different from of the base material 11A.

A ten point height of roughness profile Rz1 of the base material 11A on the face on which the anode active material layer 12 is provided is preferably 2.0 µm or less. When the roughness of the base material 11A is large, breakage is easily caused from the concavity portion by expansion and shrinkage of the anode active material layer 12. Further, by forming the projection 11B on the relatively smooth base material 11A as above, the surface shape and the roughness of the anode current collector 11 may be easily controlled.

Further, a difference Rz2−Rz1, which is obtained by subtracting the ten point height of roughness profile Rz1 of the base material 11A from a ten point height of roughness profile Rz2 of the anode current collector 11 on the face on which the anode active material layer 12 is provided is preferably from 0.2 µm to 5.1 µm. The ten point height of roughness profile Rz2 of the anode current collector 11 is more preferably from 1.3 µm to 3.5 µm. In such a range, contact characteristics between the anode current collector 11 and the anode active material layer 12 can be more improved.

The ten point height of roughness profile Rz1 of the base material 11A and the ten point height of roughness profile Rz2 of the anode current collector 11 can be obtained by cutting a cross section and image-processing the image of the cross section. The ten point height of roughness profile is determined by JIS B0601.

The anode active material layer 12 is preferably formed by vapor-phase deposition method. Thereby, destruction due to expansion and shrinkage of the anode active material layer 12 according to charge and discharge can be inhibited, the anode current collector 11 and the anode active material layer 12 can be integrated, and electron conductivity in the anode active material layer 12 can be improved.

The anode active material layer 12 is preferably alloyed with the anode current collector 11 at least in part of the interface with the anode current collector 11. Specifically, it is preferable that in the interface, the element of the anode current collector 11 is diffused in the anode active material layer 12, or the element of the anode active material layer 12 is diffused in the anode current collector 11, or both elements are diffused in each other. Thereby, contact characteristics can be improved, and the anode active material layer 12B is inhibited from falling off from the anode current collector 12A by expansion and shrinkage.

The anode 10 can be manufactured as follows, for example.

First, as the base material 11A, for example, a metal foil with the ten point height of roughness profile Rz1 of 2.0 µm or less is prepared. On the metal foil, the projection 11B is formed by electrolytic plating or the like to form the anode current collector 11. Then, by controlling the current value, time or the like, the size of the projection 11B is adjusted and the ten point height of roughness profile Rz2 of the anode current collector 11 is adjusted.

Next, the anode active material layer 12 is deposited on the anode current collector 11 by vapor-phase deposition method. As vapor-phase deposition method, for example, physical deposition method or chemical deposition method can be cited. Specifically, vacuum vapor deposition method, sputtering method, ion plating method, laser ablation method, CVD (Chemical Vapor Deposition) method, thermal spraying method or the like can be cited.

In some cases, concurrently with deposition of the anode active material layer 12, alloying of the anode active material layer 12 and the anode current collector 11 occurs. However, it is possible that after the anode active material layer 12 is deposited, heat treatment is provided under the vacuum atmosphere or the non-oxidizing atmosphere to attain alloying. Thereby, the anode 10 shown in FIG. 1 is obtained.

The anode 10 is used, for example, for the secondary battery as follows.

Figure 2:
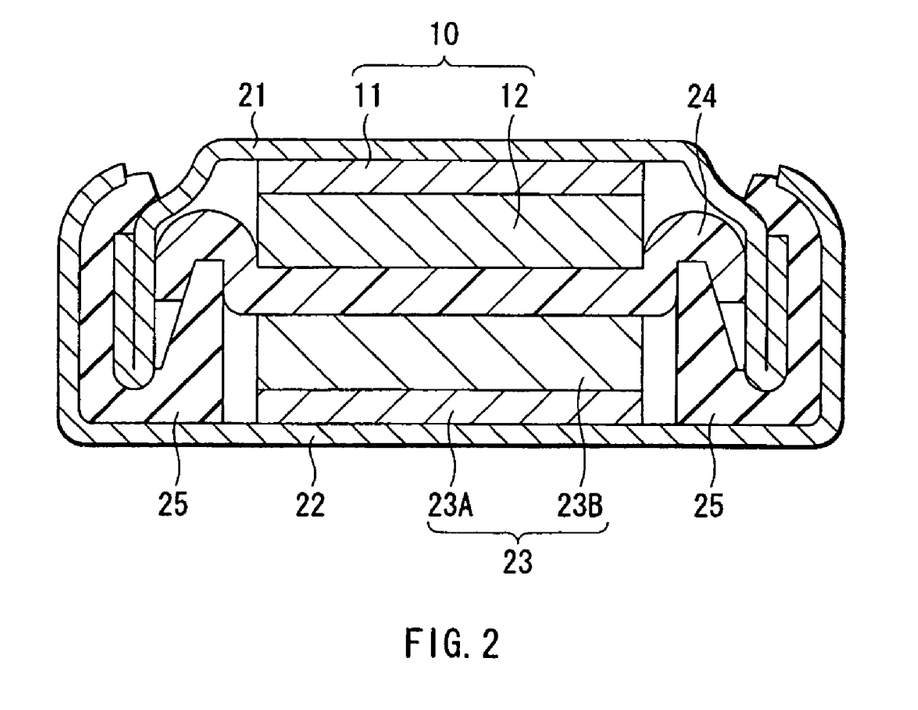
FIG. 2 is a cross section showing a structure of a secondary battery using the anode shown in FIG. 1.

FIG. 2 shows a structure of the secondary battery. The secondary battery is a so-called coin-type secondary battery. An anode 10 contained in a package cup 21 and a cathode 23 contained in a package can 22 are layered with a separator 24 inbetween.

Peripheral edges of the package cup 21 and the package can 22 are hermetically sealed by being caulked with an insulating gasket 25. The package cup 21 and the package can 22 are made of, for example, a metal such as stainless and aluminum, respectively.

The cathode 23 has a cathode current collector 23A and a cathode active material layer 23B provided on the cathode current collector 23A. Arrangement is made so that the cathode active material layer 23B side is opposed to the anode active material layer 12. The cathode current collector 23A is made of, for example, aluminum, nickel, stainless or the like.

The cathode active material layer 23B contains, for example, as a cathode active material, one or more cathode materials capable of inserting and extracting lithium. If necessary, the cathode active material layer 23B may contain an electrical conductor such as a carbon material and a binder such as polyvinylidene fluoride. As a cathode material capable of inserting and extracting lithium, for example, a lithium-containing metal complex oxide expressed by a general formula of $Li_xMIO_2$ is preferable. The lithium-containing metal complex oxide can generate a high voltage and has a high density, and therefore can contribute to a higher capacity of the secondary battery. MI represents one or more transition metal elements. MI is preferably at least one of cobalt and nickel, for example. A value of x varies according to charge and discharge states of the battery, and is generally in the range of $0.05 \leq x \leq 1.10$. As a specific example of such a lithium-containing metal complex oxide, $LiCoO_2$, $LiNiO_2$ or the like can be cited.

The cathode 23 may be formed by, for example, mixing a cathode active material, an electrical conductor, and a binder to prepare a mixture, which is dispersed in a dispersion medium such as N-methyl-2-pyrrolidone to form mixture slurry, coating the cathode current collector 23A made of a metal foil with the mixture slurry, which is dried, compression-molded to form the cathode active material layer 23B.

The separator 24 separates the anode 10 from the cathode 23, prevents current short circuit due to contact of both electrodes, and lets through lithium ions. The separator 24 is made of, for example, polyethylene or polypropylene.

An electrolytic solution as the liquid electrolyte is impregnated in the separator 24. The electrolytic solution contains, for example, a solvent and an electrolyte salt dissolved in the solvent. If necessary, additives may be contained. As a solvent, for example, a nonaqueous solvent such as ethylene carbonate, propylene carbonate, dimethyl carbonate, diethyl carbonate, and ethyl methyl carbonate can be cited. The solvent may be used singly, or two or more thereof may be used by mixing.

As an electrolyte salt, for example, a lithium salt such as $LiPF_6$, $LiCF_3SO_3$, and $LiClO_4$ can be cited. As an electrolyte salt, any of the forgoing may be used singly, or two or more thereof may be used by mixing.

The secondary battery can be manufactured, for example, by layering the anode 10, the separator 24 impregnated with the electrolytic solution, and the cathode 23, containing the lamination in the package cup 21 and the package can 22, and providing caulking.

In the secondary battery, when charged, for example, lithium ions are extracted from the cathode 23 and inserted in the anode 10 through the electrolytic solution. When discharged, for example, lithium ions are extracted from the anode 10 and inserted in the cathode 23 through the electrolytic solution. In this embodiment, the anode current collector 11 roughened by providing the projection 11B on the base material 11A with the ten point height of roughness profile Rz1 of 2.0 μm or less is used. Therefore, even if the anode active material layer 12 is expanded and shrunk due to charge and discharge, breakage of the anode current collector and fall off of the anode active material layer 12 from the anode current collector 11 are prevented.

The anode 10 according to this embodiment may be used for the following secondary battery as well.

Figure 3:
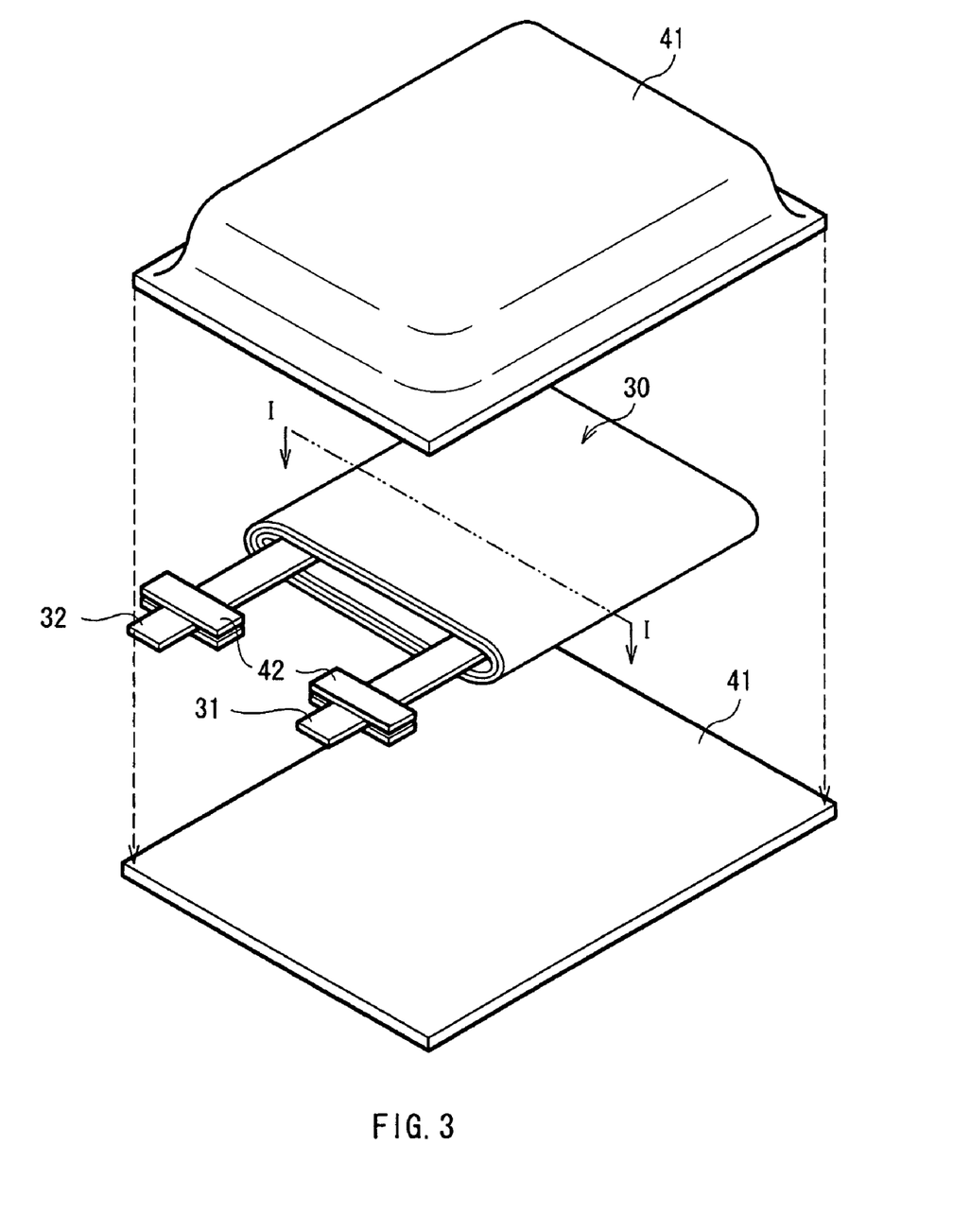
FIG. 3 is an exploded perspective view showing a structure of another secondary battery using the anode shown in FIG. 1.

FIG. 3 shows a structure of the secondary battery. In the secondary battery, a spirally wound electrode body 30 on which leads 31 and 32 are attached is contained inside a film package member 41. The size, weight, and thickness thereof can be reduced.

The leads 31 and 32 are respectively directed from inside to outside of the package member 41 in the same direction, for example. The leads 31 and 32 are respectively made of, for example, a metal material such as aluminum, copper, nickel, and stainless, and are in a state of thin plate or mesh, respectively.

The package member 41 is made of a rectangular aluminum laminated film in which, for example, a nylon film, an aluminum foil, and a polyethylene film are bonded together in this order. The package member 41 is, for example, arranged so that the polyethylene film side and the spirally wound electrode body 30 are opposed, and the respective outer edges are contacted to each other by fusion bonding or an adhesive. Adhesive films 42 to protect from outside air intrusion are inserted between the package member 41 and the leads 31, 32. The adhesive film 42 is made of a material having contact characteristics to the leads 31 and 32 such as a polyolefin resin of polyethylene, polypropylene, modified polyethylene, or modified polypropylene.

The package member 41 may be made of a laminated film having other structure, a high molecular weight film such as polypropylene, or a metal film, instead of the foregoing aluminum laminated film.

Figure 4:
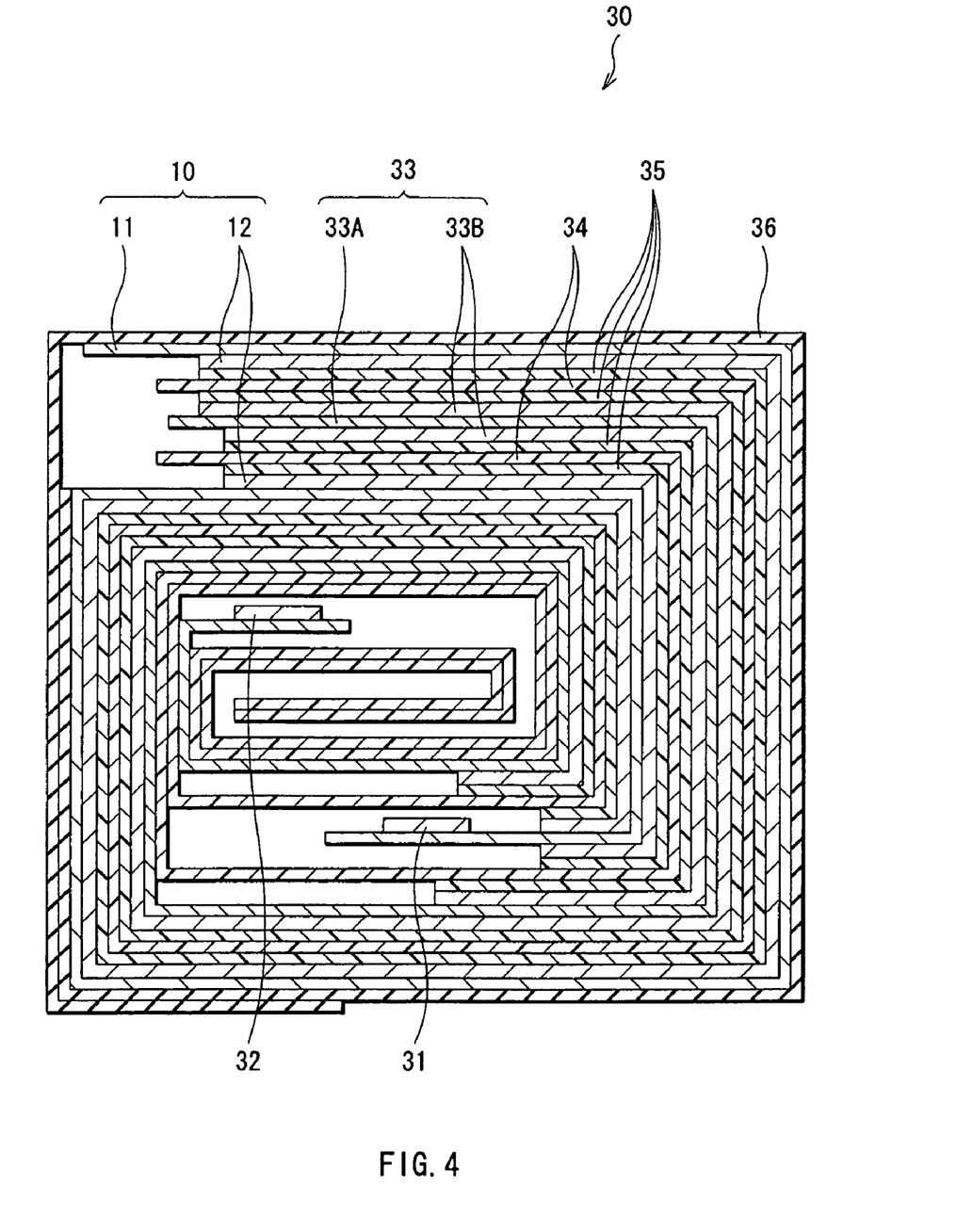
FIG. 4 is a cross section showing a structure taken along line I-I of the secondary battery shown in FIG. 3.

FIG. 4 shows a cross sectional structure taken along line I-I of the spirally wound electrode body 30 shown in FIG. 3. In the spirally wound electrode body 30, the anode 10 and a cathode 33 are layered with a separator 34 and an electrolyte layer 35 inbetween and wound. The outermost periphery thereof is protected by a protective tape 36.

The anode 10 has a structure in which the anode active material layer 12 is provided on the both faces of the anode current collector 11. The cathode 33 also has a structure in which a cathode active material layer 33B is provided on the both faces of the cathode current collector 33A. Arrangement is made so that the cathode active material layer 33B and the anode active material layer 12 are opposed. Structures of the cathode current collector 33A, the cathode active material layer 33B, and the separator 34 are similar to of the cathode current collector 23A, the cathode active material layer 23B, and the separator 24 respectively described above.

The electrolyte layer 35 is made of a so-called gelatinous electrolyte in which an electrolytic solution is held in a holding body made of a high molecular weight compound. The gelatinous electrolyte is preferable, since a high ion conductivity can be thereby obtained, and leak of the battery can be thereby prevented. The structure of the electrolytic solution is similar to of the coin-type secondary battery shown in FIG. 2. As a high molecular weight material, for example, polyvinylidene fluoride can be cited.

The secondary battery can be manufactured, for example, as follows.

First, the anode 10 and the cathode 33 are respectively formed with the electrolyte layer 35 in which an electrolytic solution is held in a holding body, and the leads 31 and 32 are attached. Next, the anode 10 and the cathode 33 formed with the electrolyte layer 35 are layered with the separator 34 inbetween. Then the lamination is wound, the protective tape 36 is adhered to the outermost periphery thereof to form the spirally wound electrode body 30. Subsequently, for example, the spirally wound electrode body 30 is sandwiched between the package members 41, and outer edges of the package members 41 are contacted by thermal fusion-bonding or the like to enclose the spirally wound electrode body 30. Then, the adhesive films 42 are inserted between the leads 31, 32 and the package member 41. Thereby, the secondary battery shown in FIG. 3 and FIG. 4 is completed.

Otherwise, the secondary battery may be manufactured as follows. First, the leads 31 and 32 are attached to the anode 10 and the cathode 33. After that, the anode 10 and the cathode 33 are layered with the separator 34 inbetween and wound. The protective tape 36 is adhered to the outermost periphery thereof, and a winding body as the precursor of the spirally wound electrode body 30 is formed. Next, the winding body is sandwiched between the package members 41, the outermost peripheries except for one side are thermal fusion-bonded to obtain a pouched state. After that, a composition of matter for electrolyte containing an electrolytic solution, a monomer as the raw material for the high molecular weight compound, a polymerization initiator, and if necessary other material such as a polymerization inhibitor is injected into the package member 41. Subsequently, the opening of the package member 41 is thermal fusion-bonded and hermetically sealed in the vacuum atmosphere. The resultant is heated to polymerize the monomer to obtain a high molecular weight compound. Thereby, the gelatinous electrolyte layer 35 is formed. Consequently, the secondary battery shown in FIG. 3 and FIG. 4 is completed.

The secondary battery works similarly to the coin-type secondary battery shown in FIG. 2.

As above, according to this embodiment, the anode current collector is roughened by providing the projection 11B on the relatively smooth base material 11A with the ten point height of roughness profile Rz1 of 2.0 μm or less. Therefore, even if the anode active material layer 12 is largely expanded and shrunk due to charge and discharge, breakage of the anode current collector 11 can be inhibited. Further, the thickness and the surface roughness of the anode current collector 11 can be freely decided, and contact characteristics of the anode active material layer 12 can be easily improved. Further, the surface roughness of the both faces of the anode current collector 11 can be easily controlled. Therefore, battery characteristics such as a capacity and cycle characteristics can be improved.

In particular, when the ten point height of roughness profile Rz2 of the anode current collector 11 is from 1.3 μm to 3.5 μm, higher effects can be obtained.

EXAMPLES

Further, specific examples of the present invention will be hereinafter given in detail with reference to the drawings.

Examples 1-1 to 1-19

The secondary battery with the structure shown in FIGS. 3 and 4 was fabricated.

First, in Examples 1-1 to 1-9, as the base material 11A, an electrolytic copper foil being 18 μm thick with the ten point height of roughness profile Rz1 of 0.8 μm was prepared. In Examples 1-10 to 1-19, as the base material 11A, a rolled copper foil being 15 μm thick with the ten point height of roughness profile Rz1 of 0.5 μm was prepared. Next, the projection 11B of copper was formed on the base material 11A by electrolytic plating to form the anode current collector 11. Then, by changing the size of the projection 11B, the ten point height of roughness profile Rz2 of the anode current collector 11 was changed in Examples 1-1 to 1-19 as shown in Table 1. Subsequently, the anode active material layer 12 being about 5.5 μm thick made of silicon was deposited on the anode current collector 11 by electron beam vacuum vapor deposition method.

92 parts by weight of lithium cobaltate (LiCoO2) powder with the average grain diameter of 5 μm as the cathode active material; 3 parts by weight of carbon black as the electrical conductor; and 5 parts by weight of polyvinylidene fluoride as the binder were mixed. The mixture was put in N-metyl-2-pyrrolidone as the dispersion medium to obtain slurry. The cathode current collector 33A made of an aluminum foil being 15 μm thick was coated with the slurry, which was dried and pressed to form the cathode active material layer 33B.

Subsequently, 37.5 wt % of ethylene carbonate, 37.5 wt % of propylene carbonate, 10 wt % of vinylene carbonate, and 15 wt % of LiPF6 were mixed to prepare an electrolytic solution. The both faces of the anode 10 and the cathode 33 were respectively coated with a precursor solution obtained by mixing 30 wt % of the electrolytic solution, 10 wt % of polyvinylidene fluoride as the block copolymer with a weight average molecular weight of 0.6 million, and 60 wt % of dimethyl carbonate, and dimethyl carbonate was volatilized. Thereby, the electrolyte layer 35 was formed.

After that, the leads 31 and 32 were attached, the anode 10 and the cathode 33 were layered with the separator 34 inbetween and wound, and the lamination was enclosed in the package member 41 made of an aluminum laminated film. Thereby, the secondary batteries of Examples 1-1 to 1-19 were obtained.

As Comparative examples 1-1 to 1-13 relative to Examples 1-1 to 1-19, secondary batteries were fabricated as in Examples 1-1 to 1-19, except that the structure of the anode current collector was changed as shown in Table 2. In Comparative example 1-1, the electrolytic copper foil identical to of Examples 1-1 to 1-9 was used, and the projection was not formed. In Comparative example 1-2, an electrolytic copper foil being 18 μm thick with the ten point height of roughness profile Rz1 of 1.2 μm was used, and the projection was not formed. In Comparative examples 1-3 to 1-5, a rolled copper foil being 15 μm thick with the ten point height of roughness profile Rz1 of 0.5 μm was used. In Comparative example 1-3, the projection was not formed, and in Comparative examples 1-4 and 1-5, the projection with sizes different from each other was formed. In Comparative examples 1-6 to 1-13, an electrolytic copper foil with large ten point height of roughness profile Rz1 was used. In Comparative examples 1-6 and 1-9, the projection was not formed, and in Comparative examples 1-7, 1-8, and 1-10 to 1-13, the projection with sizes different from each other was formed.

For the fabricated secondary batteries of Examples 1-1 to 1-19 and Comparative example 1-1 to 1-13, charge and discharge test was performed at 25 deg C. Then, the capacity retention ratio at the 101st cycle to the second cycle was obtained. Then, charge was performed until the battery voltage reached 4.2 V at a constant current density of 1 mA/cm2, and then performed until the current density reached 0.05 mA/cm2 at a constant voltage of 4.2 V. Discharge was performed until the battery voltage reached 2.5 V at a constant current density of 1 mA/cm2. Charge was performed so that the utilization ratio of the capacity of the anode 10 became 90%, and metal lithium was not precipitated on the anode 10. The capacity retention ratio was calculated as a ratio of the discharge capacity at the 101st cycle to the discharge capacity at the second cycle, that is as (discharge capacity at the 101st cycle/discharge capacity at the second cycle)×100. The results are shown in Tables 1 and 2.

Figure 5:
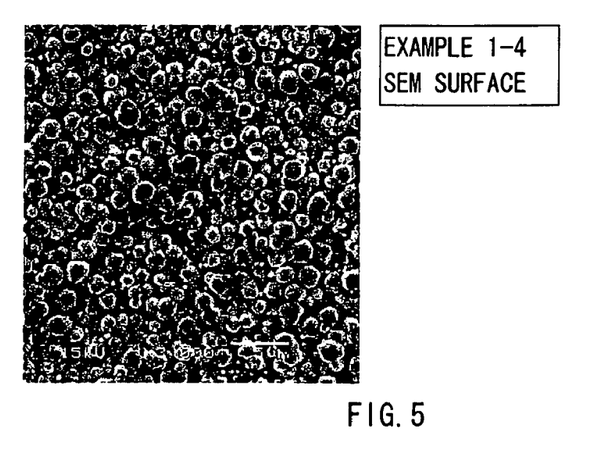
FIG. 5 is an SEM photograph showing a surface structure of an anode current collector according to Example 1-4.
Figure 6:
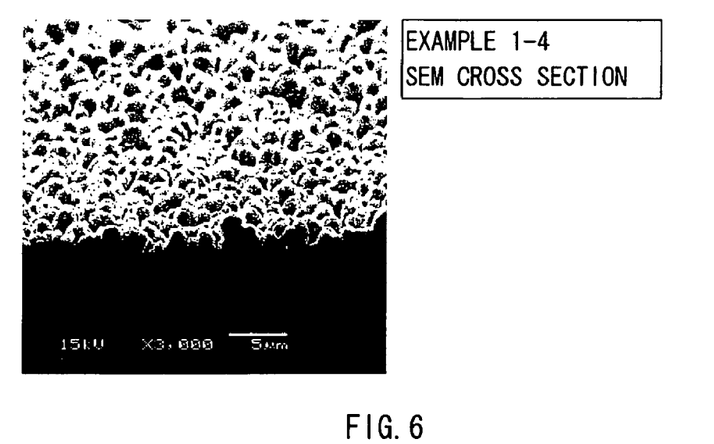
FIG. 6 is an SEM photograph showing a cross sectional structure of the anode current collector shown in FIG. 5.
Figure 7:
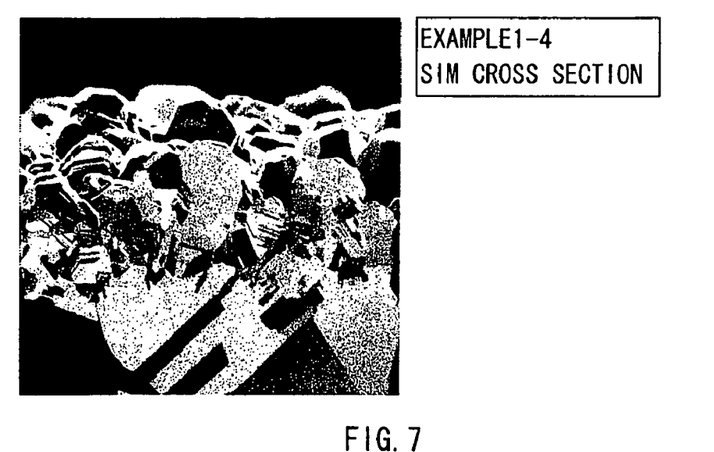
FIG. 7 is an SIM photograph showing a cross sectional structure of the anode current collector shown in FIG. 5.
Figure 8:
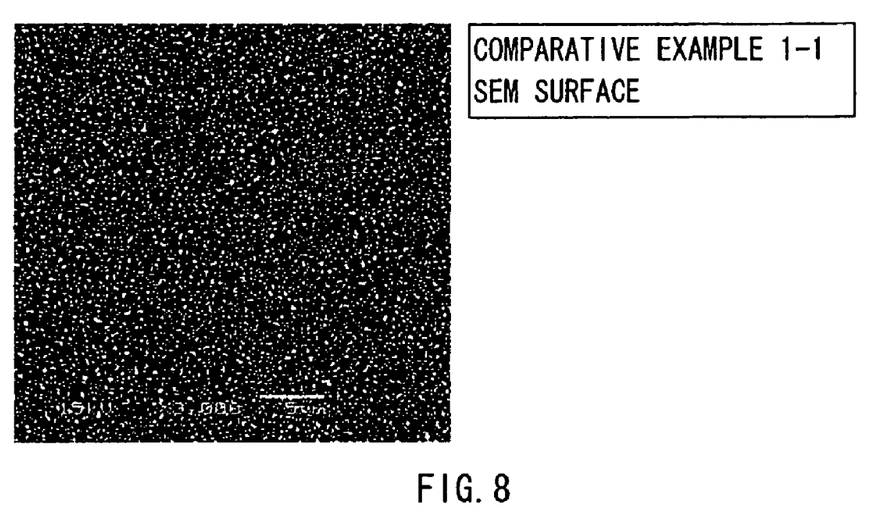
FIG. 8 is an SEM photograph showing a surface structure of an anode current collector according to Comparative example 1-1.
Figure 9:
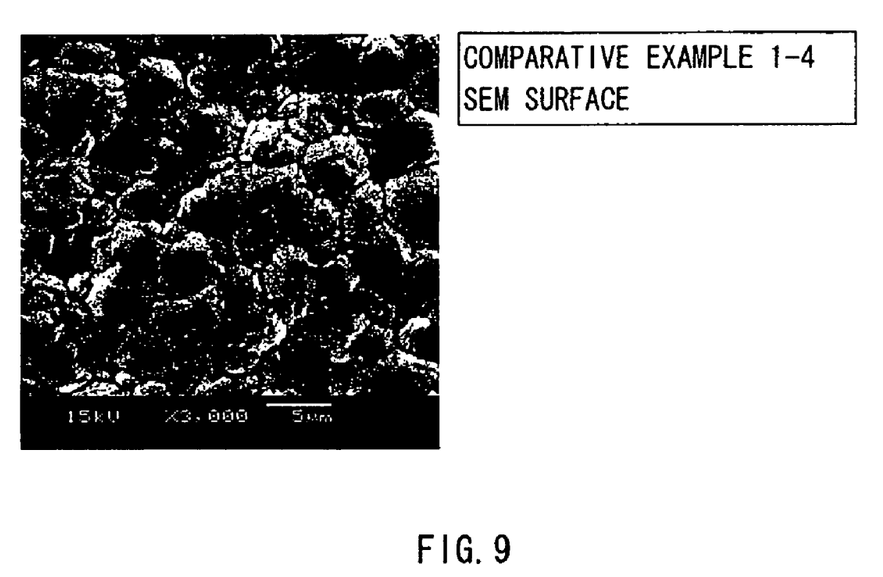
FIG. 9 is an SEM photograph showing a surface structure of an anode current collector according to Comparative example 1-4.
Figure 10:
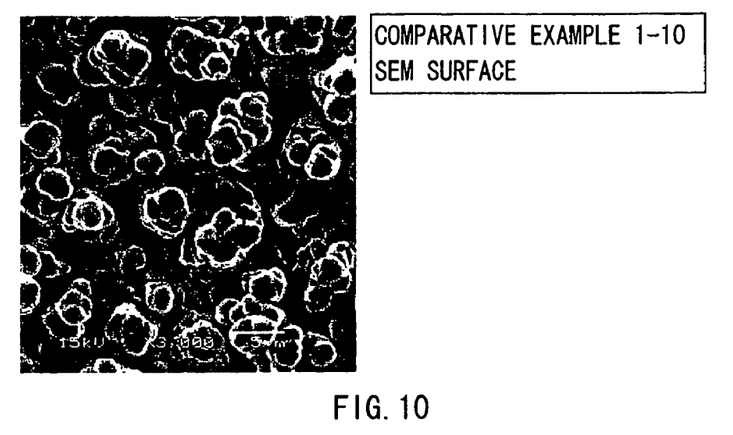
FIG. 10 is an SEM photograph showing a surface structure of an anode current collector according to Comparative example 1-10.
Figure 11:
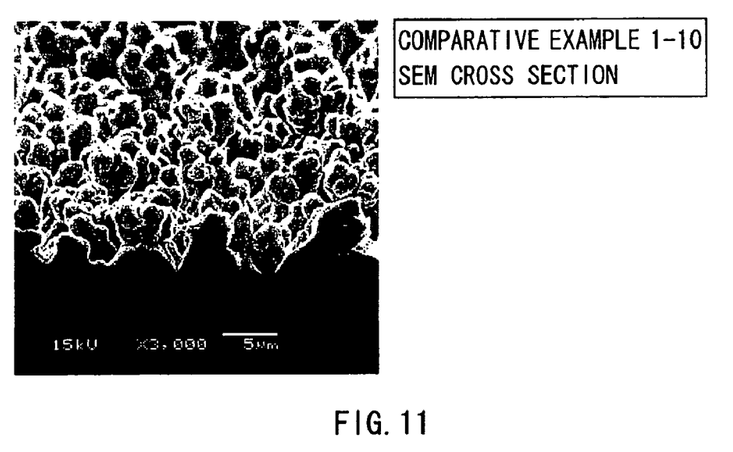
FIG. 11 is an SEM photograph showing a cross sectional structure of the anode current collector shown in FIG. 10.
Figure 12:
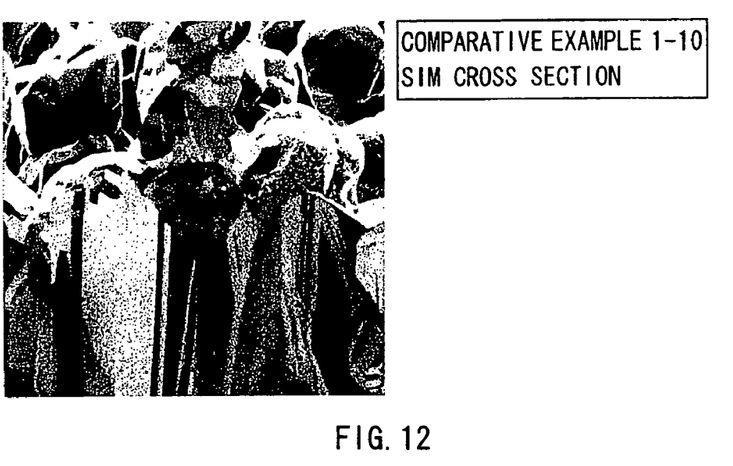
FIG. 12 is an SIM photograph showing a cross sectional structure of the anode current collector shown in FIG. 10.

Further, in FIGS. 5 to 12, Scanning Electron Microscope (SEM) photographs and Scanning Ion Microscope (SIM) photographs of the anode current collector 11 used in Example 1-4, Comparative examples 1-1, 1-4, and 1-10 are shown. FIG. 5 is a surface structure of Example 1-4, and FIGS. 6 and 7 show the cross sectional structures thereof. FIG. 8 shows a surface structure of Comparative example 1-1, FIG. 9 shows a surface structure of Comparative example 1-4, FIG. 10 shows a surface structure of Comparative example 1-10, and FIGS. 11 and 12 show the cross sectional structures thereof. As shown in FIGS. 7 and 12, crystal grain of the base material 11A is different from that of the projection 11B. Therefore, the ten point height of roughness profile of the base material 11A, Rz1 and the ten point height of roughness profile of the anode current collector 11, Rz2 can be calculated from the crystal structure thereof.

TABLE 1

| | | Anode current collector | | | | | | Capacity |
| | | Base material | | | | | | |
| | Anode active material layer | Type | Thickness (μm) | Rz1 (μm) | Projection | Rz2 (μm) | Rz2 − Rz1 (μm) | retention ratio (%) |
| --- | --- | --- | --- | --- | --- | --- | --- | --- |
| Example 1-1 | Vapor deposition | Electrolytic | 18 | 0.8 | Present | 1.2 | 0.4 | 66 |
| Example 1-2 | Vapor deposition | Electrolytic | 18 | 0.8 | Present | 1.5 | 0.7 | 72 |
| Example 1-3 | Vapor deposition | Electrolytic | 18 | 0.8 | Present | 2.1 | 1.3 | 84 |
| Example 1-4 | Vapor deposition | Electrolytic | 18 | 0.8 | Present | 2.5 | 1.7 | 90 |
| Example 1-5 | Vapor deposition | Electrolytic | 18 | 0.8 | Present | 2.9 | 2.1 | 88 |
| Example 1-6 | Vapor deposition | Electrolytic | 18 | 0.8 | Present | 3.4 | 2.6 | 75 |
| Example 1-7 | Vapor deposition | Electrolytic | 18 | 0.8 | Present | 3.8 | 3.0 | 65 |
| Example 1-8 | Vapor deposition | Electrolytic | 18 | 0.8 | Present | 4.3 | 3.5 | 73 |
| Example 1-9 | Vapor deposition | Electrolytic | 18 | 0.8 | Present | 5.5 | 4.7 | 77 |
| Example 1-10 | Vapor deposition | Rolled | 15 | 0.5 | Present | 0.7 | 0.2 | 65 |
| Example 1-11 | Vapor deposition | Rolled | 15 | 0.5 | Present | 1.1 | 0.6 | 68 |
| Example 1-12 | Vapor deposition | Rolled | 15 | 0.5 | Present | 1.3 | 0.8 | 81 |
| Example 1-13 | Vapor deposition | Rolled | 15 | 0.5 | Present | 1.8 | 1.3 | 87 |
| Example 1-14 | Vapor deposition | Rolled | 15 | 0.5 | Present | 2.2 | 1.7 | 89 |
| Example 1-15 | Vapor deposition | Rolled | 15 | 0.5 | Present | 2.6 | 2.1 | 79 |
| Example 1-16 | Vapor deposition | Rolled | 15 | 0.5 | Present | 3.0 | 2.5 | 74 |
| Example 1-17 | Vapor deposition | Rolled | 15 | 0.5 | Present | 3.6 | 3.1 | 68 |
| Example 1-18 | Vapor deposition | Rolled | 15 | 0.5 | Present | 4.2 | 3.7 | 75 |
| Example 1-19 | Vapor deposition | Rolled | 15 | 0.5 | Present | 5.6 | 5.1 | 69 |

TABLE 2

| | Anode active material layer | Anode current collector | | | | | | Capacity retention ratio (%) |
|---|---|---|---|---|---|---|---|---|
| | | Base material | | | | | | |
| | | Type | Thickness (μm) | Rz1 (μm) | Projection | Rz2 (μm) | Rz2 − Rz1 (μm) | |
| Comparative example 1-1 | Vapor deposition | Electrolytic | 18 | 0.8 | Not present | 0.8 | — | 8 |
| Comparative example 1-2 | Vapor deposition | Electrolytic | 18 | 1.2 | Not present | 1.2 | — | 25 |
| Comparative example 1-3 | Vapor deposition | Rolled | 15 | 0.5 | Not present | 0.5 | — | 15 |
| Comparative example 1-4 | Vapor deposition | Rolled | 15 | 0.5 | Present | 0.6 | 0.1 | 50 |
| Comparative example 1-5 | Vapor deposition | Rolled | 15 | 0.5 | Present | >5.6 | >5.1 | 18 |
| Comparative example 1-6 | Vapor deposition | Electrolytic | 10 | 2.2 | Not present | 2.2 | — | 38 |
| Comparative example 1-7 | Vapor deposition | Electrolytic | 10 | 2.2 | Present | 2.6 | 0.4 | 43 |
| Comparative example 1-8 | Vapor deposition | Electrolytic | 10 | 2.2 | Present | 3.5 | 1.3 | 41 |
| Comparative example 1-9 | Vapor deposition | Electrolytic | 18 | 4.4 | Not present | 4.4 | — | 44 |
| Comparative example 1-10 | Vapor deposition | Electrolytic | 18 | 4.4 | Present | 6.0 | 1.6 | 56 |
| Comparative example 1-11 | Vapor deposition | Electrolytic | 18 | 4.4 | Present | 7.2 | 2.8 | 48 |
| Comparative example 1-12 | Vapor deposition | Electrolytic | 18 | 4.4 | Present | 8.0 | 3.6 | 51 |
| Comparative example 1-13 | Vapor deposition | Electrolytic | 18 | 4.4 | Present | 9.0 | 4.6 | 54 |

As shown in Table 1, in Examples 1-1 to 1-19, in which the projection 11B was formed on the base material 11A with the ten point height of roughness profile Rz1 of 2.0 μm or less and Rz2−Rz1 was from 0.2 μm to 5.1 μm, the high capacity retention ratio of 65% or more was obtained.

Meanwhile, as shown in Table 2, in Comparative examples 1-1 to 1-3, in which the base material with the ten point height of roughness profile Rz1 of 2.0 μm or less was used and the projection was not formed; and in Comparative example 1-4, in which the projection was formed on the base material with the ten point height of roughness profile Rz1 of 2.0 μm or less and Rz2−Rz1 was 0.1 μm, contact characteristics between the anode current collector and the anode active material layer was low, and the capacity retention ratio was low, 50% or less. Further, in Comparative example 1-5, in which the projection was formed on the base material with the ten point height of roughness profile Rz1 of 2.0 μm or less and Rz2−Rz1 was larger than 5.1 μm, contact characteristics between the anode current collector and the anode active material layer could not be improved since the projection was fallen off, and the capacity retention ratio was low, 18%.

Further, in Comparative examples 1-6 and 1-9, in which the base material with the ten point height of roughness profile Rz1 of over 2.0 μm was used and the projection was not formed; and in Comparative examples 1-7, 1-8, and 1-10 to 1-13, in which the projection was formed on the base material with the ten point height of roughness profile Rz1 of over 2.0 μm and Rz2−Rz1 was from 0.2 μm to 5.1 μm, the capacity retention ratio was also low, 56% or less.

Further, as evidenced by comparison between Example 1-4 (capacity retention ratio: 90%) and Comparative example 1-7 (capacity retention ratio: 43%), whose ten point height of roughness profile Rz2 of the anode current collector 11 was close to each other, or by comparison between Example 1-17 (capacity retention ratio: 68%) and Comparative example 1-8 (capacity retention ratio: 41%), whose ten point height of roughness profile Rz2 of the anode current collector 11 was close to each other, even when the surface roughness of the anode current collector 11 was identical, the capacity retention ratio was significantly different depending on the surface state.

That is, it was found that when the base material 11A with the ten point height of roughness profile Rz1 of 2 μm or less was used and the projection 11B was formed, and thereby the difference Rz2−Rz1 between the ten point height of roughness profile Rz2 of the anode current collector 11 and the ten point height of roughness profile Rz1 of the base material 11A was from 0.2 μm to 5.1 μm, cycle characteristics could be improved.

Further, according to Examples 1-2 to 1-6 and 1-12 to 1-16, in which the ten point height of roughness profile Rz2 of the anode current collector 11 was from 1.3 μm to 3.5 μm, the capacity retention ratio of 70% or more was obtained. That is, it was found that it was more preferable that the ten point height of roughness profile Rz2 of the anode current collector 11 was from 1.3 μm to 3.5 μm.

Examples 2-1 to 2-8

Secondary batteries were fabricated as in Examples 1-2 to 1-9, except that the anode active material layer 12 was deposited by sputtering method. Further, as Comparative examples 2-1 to 2-5 relative to Examples 2-1 to 2-8, secondary batteries were fabricated as in Examples 2-1 to 2-8, except that the anode current collector similar to of Comparative examples 1-10 to 1-13 was used. For the secondary batteries of Examples 2-1 to 2-8 and Comparative examples 2-1 to 2-5, the capacity retention ratio was obtained as in Examples 1-2 to 1-9. The results are shown in Table 3.

TABLE 3

| | Anode active material layer | Anode current collector | | | | | | Capacity retention ratio (%) |
|---|---|---|---|---|---|---|---|---|
| | | Base material | | | | Rz2 (μm) | Rz2 − Rz1 (μm) | |
| | | Type | Thickness (μm) | Rz1 (μm) | Projection | | | |
| Example 2-1 | Sputtering | Electrolytic | 18 | 0.8 | Present | 1.5 | 0.7 | 69 |
| Example 2-2 | Sputtering | Electrolytic | 18 | 0.8 | Present | 2.1 | 1.3 | 72 |
| Example 2-3 | Sputtering | Electrolytic | 18 | 0.8 | Present | 2.5 | 1.7 | 74 |
| Example 2-4 | Sputtering | Electrolytic | 18 | 0.8 | Present | 2.9 | 2.1 | 73 |
| Example 2-5 | Sputtering | Electrolytic | 18 | 0.8 | Present | 3.3 | 2.5 | 73 |
| Example 2-6 | Sputtering | Electrolytic | 18 | 0.8 | Present | 3.8 | 3.0 | 69 |
| Example 2-7 | Sputtering | Electrolytic | 18 | 0.8 | Present | 4.3 | 3.5 | 66 |
| Example 2-8 | Sputtering | Electrolytic | 18 | 0.8 | Present | 5.5 | 4.7 | 65 |
| Comparative example 2-1 | Sputtering | Electrolytic | 18 | 4.4 | Not present | 4.4 | — | 61 |
| Comparative example 2-2 | Sputtering | Electrolytic | 18 | 4.4 | Present | 6.0 | 1.6 | 54 |
| Comparative example 2-3 | Sputtering | Electrolytic | 18 | 4.4 | Present | 7.2 | 2.8 | 59 |
| Comparative example 2-4 | Sputtering | Electrolytic | 18 | 4.4 | Present | 8.0 | 3.6 | 62 |
| Comparative example 2-5 | Sputtering | Electrolytic | 18 | 4.4 | Present | 9.0 | 4.6 | 61 |

As shown in Table 3, in the case of forming the anode active material layer 12 by sputtering method, similar results could be obtained.

The present invention has been described with reference to the embodiment and the examples. However, the present invention is not limited to the embodiment and the examples, and various modifications may be made. For example, in the foregoing embodiment and examples, descriptions have been given of the case using the electrolytic solution, the liquid electrolyte or the so-called gelatinous electrolyte. However, other electrolyte may be used. As other electrolyte, a solid electrolyte having ion conductivity, a mixture of a solid electrolyte and an electrolytic solution, or a mixture of a solid electrolyte and a gelatinous electrolyte can be cited.

For the solid electrolyte, for example, a high molecular weight solid electrolyte in which an electrolyte salt is dispersed in a high molecular weight compound having ion conductivity, or an inorganic solid electrolyte composed of ion conductive glass, ionic crystal or the like can be used. As a high molecular weight compound of the high molecular weight solid electrolyte, for example, an ether high molecular weight compound such as polyethylene oxide and a crosslinked body containing polyethylene oxide, an ester high molecular weight compound such as poly methacrylate, or an acrylate high molecular weight compound can be used singly, by mixing, or by copolymerization. As an inorganic solid electrolyte, a substance containing lithium nitride, lithium phosphate or the like can be used.

Further, in the foregoing embodiment and examples, descriptions have been given of the coin-type secondary battery and the winding laminated type secondary battery. However, the present invention can be similarly applied to a secondary battery having other shape such as a cylindrical-type secondary battery, a square-type secondary battery, a button-type secondary battery, a thin secondary battery, a large secondary battery, and a laminated-type secondary battery. In addition, the present invention can be applied not only to the secondary batteries, but also to primary batteries.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. An anode comprising an anode active material layer containing silicon that is provided on an anode current collector,
    wherein the anode current collector has a base material and a projection formed on the base material,
    the base material of the anode current collector having a ten point height of roughness profile, $Rz1$, on a face on which the anode active material layer is provided,
    the anode current collector having a ten point height of roughness profile, $Rz2$, on a face on which the anode active material layer is provided, and
    wherein
    $Rz1$ is about 0.8 μm or less,
    $Rz2$ is from about 0.7 μm to about 5.6 μm, and
    a difference obtained by subtracting $Rz1$ from $Rz2$ ranges from 0.2 μm to 5.1 μm.

2. An anode according to claim 1, wherein the ten point height of roughness profile $Rz2$ of the anode current collector ranges from 1.3 μm to 3.5 μm.

3. An anode according to claim 1, wherein the difference obtained by subtracting $Rz1$ from $Rz2$ is from about 0.6 μm to about 2.6 μm.

4. An anode according to claim 1, wherein the anode active material layer is alloyed with the anode current collector at least in part of an interface with the anode current collector.

5. An anode according to claim 1, wherein:
    the base material contains a metal element not forming an intermetallic compound with lithium and the projection contains an element capable of being alloyed with silicon, and
    the element of the projection is different from the metal element of the base material.

6. An anode according to claim 1, wherein the base material has a thickness of 15 μm to 18 μm.

7. A battery comprising:
    a cathode;
    an anode; and an electrolyte, wherein in the anode, an anode active material layer containing silicon is provided on an anode current collector, the anode current collector has a base material and a projection formed on the base material, the base material of the anode current collector having a ten point height of roughness profile, Rz1, on a face on which the anode active material layer is provided, the anode current collector having a ten point height of roughness profile, Rz2, on a face on which the anode active material layer is provided, and wherein Rz1 is about 0.8 μm or less, Rz2 is from about 0.7 μm to about 5.6 μm, and a difference obtained by subtracting Rz1 from Rz2 ranges from 0.2 μm to 5.1 μm.

8. A battery according to claim 7, wherein the ten point height of roughness profile Rz2 of the anode current collector ranges from 1.3 μm to 3.5 μm.

9. A battery according to claim 7, wherein the difference obtained by subtracting Rz1 from Rz2 is from about 0.6 μm to about 2.6 μm.

10. A battery according to claim 7, wherein in the cathode, a cathode active material includes a lithium-containing metal complex oxide.

11. A battery according to claim 7, wherein the anode active material layer is alloyed with the anode current collector at least in part of an interface with the anode current collector.

12. A battery according to claim 7, wherein:

the base material contains a metal element not forming an intermetallic compound with lithium and the projection contains an element capable of being alloyed with silicon, and the element of the projection is different from the metal element of the base material.

13. A battery according to claim 7, wherein the base material has a thickness of 15 μm to 18 μm.

* * * * *